United States Patent
Wulf et al.

(10) Patent No.: US 7,798,722 B2
(45) Date of Patent: Sep. 21, 2010

(54) ROUND BEARING

(75) Inventors: Andreas Wulf, Barnstorf (DE); Ralf Berelsmann, Wallenhorst (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1315 days.

(21) Appl. No.: 10/513,799

(22) PCT Filed: Jun. 4, 2003

(86) PCT No.: PCT/EP03/05822

§ 371 (c)(1),
(2), (4) Date: Nov. 18, 2004

(87) PCT Pub. No.: WO03/104676

PCT Pub. Date: Dec. 18, 2003

(65) Prior Publication Data

US 2005/0207685 A1  Sep. 22, 2005

(30) Foreign Application Priority Data

Jun. 10, 2002  (DE) ................. 102 25 797

(51) Int. Cl.
*F16F 1/38* (2006.01)
*F16F 1/373* (2006.01)

(52) U.S. Cl. ............... 384/297; 267/141.2; 403/221; 403/225; 428/318.6

(58) Field of Classification Search .......... 384/297; 267/136, 140.12, 141, 141.2; 403/221, 223, 403/225, 226, 228; 428/318.6, 318.8
See application file for complete search history.

(56) References Cited

U.S. PATENT DOCUMENTS

| | | | |
|---|---|---|---|
| 3,171,699 A | | 3/1965 | Maxey |
| 4,714,512 A | * | 12/1987 | House et al. ............. 156/306.6 |
| 4,840,395 A | * | 6/1989 | Sturmon ................. 280/86.75 |
| 5,102,714 A | * | 4/1992 | Mobley et al. ............... 428/95 |
| 2003/0138621 A1 | * | 7/2003 | Bollmann et al. ........ 428/318.6 |

FOREIGN PATENT DOCUMENTS

| | | | |
|---|---|---|---|
| DE | 202 01 879 | | 4/2002 |
| EP | 1 013 416 | * | 6/2000 |
| SU | 1601230 | * | 10/1990 |
| SU | 1640229 | * | 4/1991 |
| SU | 1675424 | * | 9/1991 |

* cited by examiner

Primary Examiner—William C Joyce
(74) Attorney, Agent, or Firm—Oblon, Spivak, McClelland, Maier & Neustadt, L.L.P.

(57) ABSTRACT

Round bearings comprise (i) an outer bush, (ii) a bearing element based on polyisocyanate polyadducts and (iii) a hollow inner bush. A surface of the outer bush and/or the hollow inner bush that is adjacent to (ii) the bearing element containing thermoplastic polyurethane.

11 Claims, 2 Drawing Sheets

ROUND BEARING

BACKGROUND OF THE INVENTION

1. Field of the Invention

The present invention relates to bearings.

2. Description of the Related Art

Round bearings are used inside the chassis of automobiles and for mounting assemblies and are generally known. With the aid of round bearings, assemblies, chassis components, etc. are connected to one another or to the bodywork with the aid of round bearings. Through the use of elastomer materials, they perform the function of an elastic bearing; on the other hand, owing to their viscous properties, they are capable of dissipating energy and hence damping vibrations. A high degree of damping is required in particular for damping large amplitudes of low-frequency vibrations which influence, for example, the connection of shock absorbers to the bodywork. On the other hand, for reasons relating to vehicle acoustics, high damping is undesired in the case of low amplitudes and higher frequencies. The damping behavior of current, conventional round bearings is dependent on the intrinsic damping capacity of the elastomer material used.

SUMMARY OF THE INVENTION

The present invention relates to round bearings comprising (i) a preferably cylindrical outer bush, (ii) a preferably cylindrical, preferably hollow bearing element based on, preferably, cellular polyisocyanate polyadducts, preferably based on cellular polyurethane elastomers which, if required, may contain polyurea structures, particularly preferably based on cellular polyurethane elastomers preferably having a density, according to DIN 53 420, of from 200 to 1 100, preferably from 300 to 800, kg/m$^3$, a tensile strength, according to DIN 53571, of $\leqq 2$, preferably from 2 to 8, N/mm$^2$, an elongation, according to DIN 53571, of $\leqq 300$, preferably from 300 to 700, % and a tear propagation strength, according to DIN 53515, of $\leqq 8$, preferably from 8 to 25, N/mm, which are preferably surrounded by the outer bush, and (iii) a hollow, preferably cylindrical inner bush which is preferably positioned in the bearing element (ii). The present invention also relates to automobiles or trucks comprising the novel round bearings.

BRIEF DESCRIPTION OF THE DRAWINGS

Novel round bearings are shown in FIGS. 1 to 4.

Figure 1:
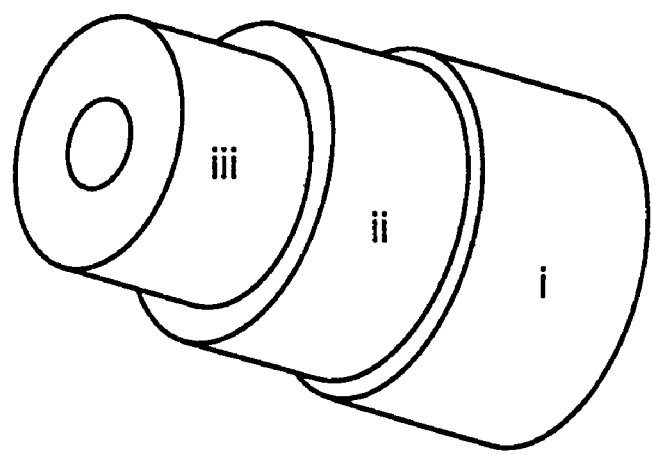
FIG. 1 shows a round bearing comprising inner bush (iii), bearing element (ii) and outer bush (i)
Figure 2:
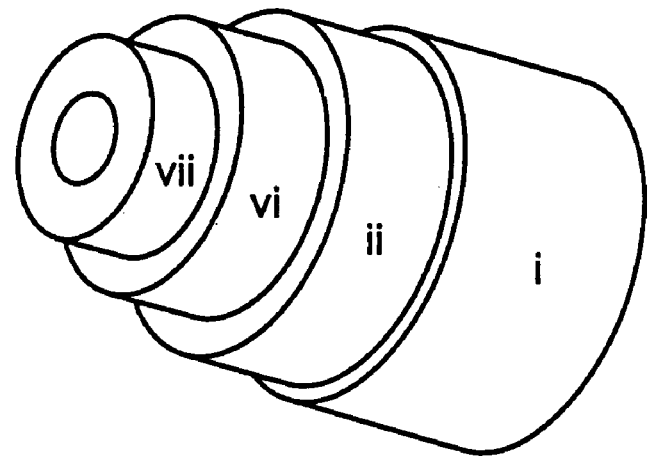
FIG. 2 shows a round bearing in which the inner bush consists of an external inner bush (vi) containing TPU and an internal inner bush (vii) comprising metal.
Figure 3:
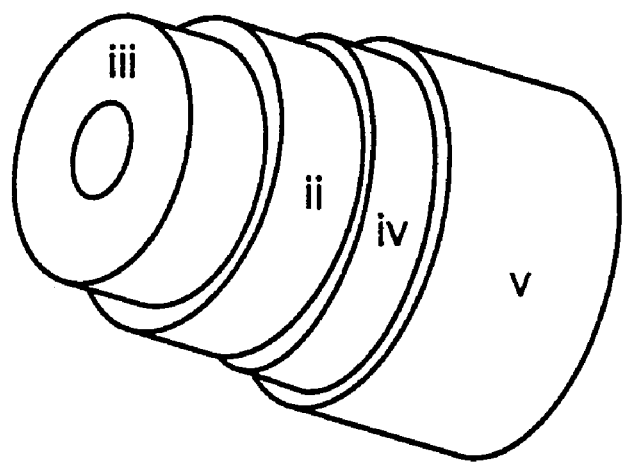
FIG. 3 shows a round bearing in which the outer bush consists of an internal outer bush (iv) containing TPU and an external outer bush (v) comprising metal.
Figure 4:
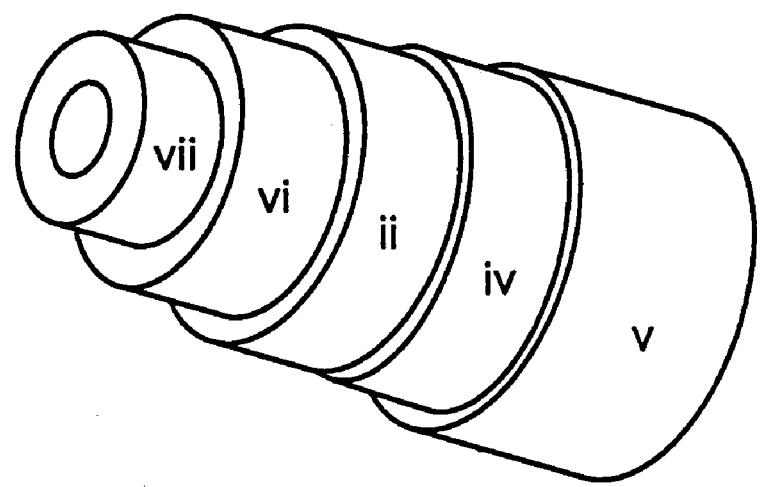
FIG. 4 shows a round bearing comprising a two-part inner and outer bush. In the figures, the individual bushes are shown projecting for greater clarity.

According to the invention, the individual bushes/bearing elements may have the same height. It is also possible for the inner parts of the round bearing to have a smaller height than the outer parts, whereas in the figures the inner parts have a greater height and project.

DETAILED DESCRIPTION OF THE PREFERRED EMBODIMENTS

It is an object of the present invention to provide round bearings comprising (i) an outer bush, (ii) a bearing element based on cellular polyisocyanate polyadducts and (iii) a hollow inner bush, in which the adhesive bond between the bearing element and the hollow inner bush is no longer to be achieved by means of an adhesion promoter. For applications where a round bearing had to be joined by means of a screw connection, the use of a metallic sleeve should be possible, and improved corrosion protection was required.

We have found that this object is achieved if that surface of (i) and/or (iii) which is adjacent to (ii) the bearing element contains thermoplastic polyurethane with or without glass fiber filler and/or polyurethane casting elastomers, preferably thermoplastic polyurethane.

By using thermoplastic polyurethane, also referred to below as TPU, it is ensured that it is possible to dispense with the use of chemical adhesion promoters in the connection of the bearing element, because cellular polyisocyanate polyadduct forms a very good adhesive bond to TPU. Through the preferred use of the TPU in combination with a metallic insert, the inner bush can be used for a screw connection. The combination of TPU and metal to give a hollow inner bush, in the form of an interlocking, frictional or integral connection, makes it possible in particular to dispense with a special corrosion protection of the metallic parts through the use of stainless steel or aluminum. Thus, the abovementioned requirement could be met by this combination of different materials. Alternatively or in addition to the particularly preferred TPUs, generally known polyurethane casting elastomers can be used. In contrast to the TPUs, the casting elastomers are usually crosslinked polyurethanes.

Thermoplastic polyurethanes are generally known and commercially available, for example from Elastogran GmbH, Germany. Preferably, the thermoplastic polyurethane has a hardness of from 60 Shore A to 85 Shore D. The TPUs can, if required, also be used in generally known mixtures with further thermoplastics, for example polyolefins, ABS and/or ASA plastics, and fillers, e.g. glass fibers. The TPUs are preferably not used as a mixture with other plastics but contain glass fibers as a filler. The TPUs may be based on generally known raw materials, for example the generally customary isocyanates, polyols, chain extenders, catalysts and assistants. The production both with TPU-coated inner and/or outer bushes or with these bushes completely based on TPU or mixtures of TPU with other thermoplastics is generally known and familiar to a person skilled in the art. For example, the inner and/or the outer bush can be produced from the TPU by means of injection molding. Coating of prefabricated metal bushes with TPU sheets, which were melted on the desired surface of the bush, is also possible. The thickness of the TPU which is adjacent to the bearing element (ii) is preferably from 1 to 15 mm.

The inner bush (iii) can, for example, be completely based on thermoplastic polyurethane. Alternatively, it is possible for the inner bush (iii) to comprise an external bush (vi) directed toward the bearing element (ii) and based on thermoplastic polyurethane and an internal bush (vii) adjacent to the external bush (vi) and based on metal, e.g. steel, iron and/or aluminum. In the two-part version, the bushes (vi) and (vii) are preferably connected to one another by an integral, interlocking or frictional connection, for example by adhesively bonding them to one another, screwing one into the other or pressing one onto the other. For example, adhesion between the bushes can be achieved by melting a TPU sheet as (vi) internal bush onto the external bush. The inner bush (iii) has an inner bore, usually for receiving a fastening bolt. The external diameter is determined by the design.

In applications where no adhesive bond is required between that surface of the inner bush which faces the bearing element, said inner bush can be provided with a, preferably, attached collar which runs all round, preferably perpendicular to, the inner bore and preferably on the outer surface of the inner bush (iii). Said collar may vary in diameter, thickness, design and number. The collar forms the preferred frictional surface in the case of a radial load on the side walls and displacement-limiting means on compression of the suspension in the case of a load on the end face. This contour also has particularly advantageous characteristics when cardanic loads occur. Preferably, the bearing element (ii) does not project beyond the inner bush in the axial direction.

According to the invention, the bearing element (ii) may consist of one or more individual parts which have elastic properties. If at least two bearing elements are used, they may be joined, so to speak, in a connected system to give the complete bearing element, it being possible to choose generally known connecting methods, for example tongue-and-groove. It is therefore possible to produce bearing elements which have different properties and, depending on their arrangement in the round bearing, can meet specific requirements. If at least two bearing element (ii) are used, they preferably have different densities and hence different mechanical and dynamic properties. While, for example, a bearing element (ii) may consist of a microcellular PU having a low density, in order to generate a great deal of damping by the relative movement of inner and outer bush during use, the further bearing element (ii) in the round bearing may be produced from a microcellular PU having a high density, in order to ensure dynamic rigidities and to reduce the maximum deformation. According to the invention, it is therefore possible to meet specific requirements. Bearing elements (ii) comprising preferably compact TPU are also conceivable. The novel bearing element (ii) is preferably based on elastomers based on polyisocyanate polyadducts, for example polyurethanes and/or polyureas, for example polyurethane elastomers which, if required, may contain urea structures. The elastomers are preferably microcellular elastomers based on polyisocyanate polyadducts, preferably with cells having a diameter of from 0.01 to 0.5 mm, particularly preferably from 0.01 to 0.15 mm. Particularly preferably, the elastomers have the physical properties described at the outset. Elastomers based on polyisocyanate polyadducts and their preparation are generally known and widely described, for example in EP-A 62 835, EP-A 36 994, EP-A 250 969, DE-A 195 48 770 and DE-A 195 48 771. The preparation is usually carried out by reacting isocyanates with compounds reactive toward isocyanates. The elastomers based on cellular polyisocyanate polyadducts are usually prepared in a mold, in which the reactive starting components are reacted with one another. Suitable molds here are generally customary molds, for example metal molds which, owing to their shape, ensure the novel three-dimensional shape of the spring element. The preparation of the polyisocyanate polyadducts can be carried out by generally known processes, for example by using the following starting materials in a one- or two-stage process:

(a) isocyanate,
(b) compounds reactive toward isocyanates,
(c) water and, if required,
(d) catalysts,
(e) blowing agents and/or
(f) assistants and/or additives, for example polysiloxanes and/or fatty acid sulfonates.

The cellular polyisocyanate polyadducts preferably have a compression set of less than 25% according to DIN 53572, the test specimens used being blocks measuring 40 mm×40 mm×30 mm without a silicone coating, the test is carried out at constant deformation, the test specimens being compressed by 40% and kept for 22 hours at 80° C. in a through-circulation oven, the test apparatus is cooled to room temperature for 2 hours in the compressed state after removal from the oven and then the test specimen is removed from the test apparatus and, 10 min±30 s after the removal of the test specimens from the test apparatus, the height of the test specimens is measured accurately to 0.1 mm. The bearing element (ii) is preferably adhesively bonded to the thermoplastic polyurethane of the outer bush (i) and/or of the inner bush (iii). The expression adhesively bonded is to be understood as meaning in particular that the bearing element (ii) is stuck to the TPU, for example using generally customary adhesives, or is foamed directly on the TPU. A preferably used adhesive is a reactive hotmelt adhesive, preferably based on encapsulated isocyanates, having a melting range at temperatures of less than 95° C., preferably from 30 to 90° C., particularly preferably from 45 to 65° C., and a reaction range at temperatures preferably greater than 100° C., particularly preferably from 110 to 125° C. Such reactive hotmelt adhesives are available from Collano Ebnother AG, Sempach-Station, Switzerland, and are described in the article Vorapplizierbare PUR-Hotmelts: Aktivierung per Wärmestoβ, Adhasion Kleben und Dichten, 43rd year, 10/99, pages 22 to 24. The production of the bearing element on the surface of the TPU can be effected by generally known methods, for example by placing the corresponding TPU sleeve in a mold and preparing the cellular polyisocyanate polyadduct in this mold.

The outer bush (i) may be based completely on thermoplastic polyurethane. Alternatively, it is possible for the outer bush (i) to comprise an internal bush (iv) directed toward the bearing element (ii) and based on thermoplastic polyurethane and an external bush (v) adjacent to the internal bush (iv) and based on metal, e.g. steel, iron and/or aluminum. In the case of the two-part version, the bushes (iv) and (v) are preferably adhesively bonded to one another, for example by sticking them to one another. For example, adhesion between the bushes can be achieved by melting a TPU sheet as (iv) internal bush onto the external bush. The outer bush (i) has an external diameter and an internal diameter which can vary in dimensions and form. The present invention relates to both sized and unsized bushes. Fixing of the individual parts, i.e. inner bush (iii), bearing element(s) (ii) and outer bush (i) can be achieved, for example, by sizing. For example, during assembly, the individual parts can be joined together in the outer bush, the external diameter of the inner bush being slightly smaller than the internal diameter of the outer bush. After all parts have been joined together, the outer bush can then be made smaller in diameter, with the result that the inserted parts are fixed to one another. The outer bush may also be designed in such a way that it is completed with the elastomer materials and the inner bush before a one-part or multipart shaping process for final shaping. The elastomer parts may have a larger external diameter than the internal diameter of the outer bush. An initial stress of the elastomer component is thus achieved. In the case of this method of construction, it is possible to dispense with a subsequent sizing process. These advantages also apply if the internal diameter of the elastomer components is smaller than the external diameter of the inner bush.

Preferably, the bearing elements (ii) are positioned with an exact fit in the outer bush (i) and the inner bush (iii) with an exact fit in the bearing element, which may be composed of the individual bearing elements (ii), so that the parts are fixed to one another in such a way that the total bearing element consisting of the individual bearing elements (ii) rubs both against (i) and against (iii) if this is desired by the design.

We claim:

1. A round bearing for use inside a chassis of automobiles and for mounting assemblies, comprising:
    an outer bush;
    a bearing element based on cellular polyisocyanate polyadducts; and
    a hollow inner bush,
    wherein a surface of the outer bush and/or the hollow inner bush, which is adjacent to the bearing element based on cellular polyisocyanate polyadducts, is formed of thermoplastic polyurethane and/or polyurethane casting elastomers.

2. A round bearing as claimed in claim 1, wherein the outer bush includes an internal bush directed toward the bearing element and based on thermoplastic polyurethane and an external bush adjacent to the internal bush and based on metal.

3. A round bearing as claimed in claim 1, wherein the hollow inner bush is based on thermoplastic polyurethane.

4. A round bearing as claimed in claim 1, wherein the hollow inner bush includes an exterior bush directed toward the bearing element and based on thermoplastic polyurethane and an inner bush adjacent to the exterior bush and based on metal.

5. A round bearing as claimed in claim 2, wherein the internal bush and external bush are adhesively bonded.

6. A round bearing as claimed in claim 4, wherein the exterior bush and inner bush are adhesively bonded.

7. A round bearing as claimed in claim 1, wherein the thermoplastic polyurethane adjacent to the bearing element has a thickness of from 1 to 15 mm.

8. A round bearing as claimed in claim 1, wherein the bearing element is adhesively bonded to the thermoplastic polyurethane of at least one of the outer bush and the hollow inner bush.

9. A round bearing as claimed in claim 1, wherein the thermoplastic polyurethane has a hardness of from Shore 60 A to Shore 85 D.

10. An automobile comprising a round bearing as claimed in claim 1.

11. A round bearing as claimed in claim 1, wherein the thermoplastic polyurethane contains a glass fiber filler.

* * * * *